United States Patent
Hirano

[11] Patent Number: 5,877,431
[45] Date of Patent: Mar. 2, 1999

[54] APPARATUS FOR MEASURING TENSION OF BELT

[75] Inventor: Shigeaki Hirano, Kobe, Japan

[73] Assignee: Mitsubishi Denki Kabushiki Kaisha, Tokyo, Japan

[21] Appl. No.: 608,058

[22] Filed: Feb. 28, 1996

[30] Foreign Application Priority Data

Apr. 24, 1995 [JP] Japan .................................. 7-098813

[51] Int. Cl.$^6$ .................................................. G01L 5/04
[52] U.S. Cl. .................................. 73/862.41; 73/862.453
[58] Field of Search ........................ 73/862.391, 862.41, 73/862.42, 862.453

[56] References Cited

U.S. PATENT DOCUMENTS

| | | | |
|---|---|---|---|
| 3,854,329 | 12/1974 | Jones | 73/862.41 |
| 4,158,962 | 6/1979 | Conval | 73/862.41 |
| 4,565,099 | 1/1986 | Arnold | 73/862.41 |
| 4,731,044 | 3/1988 | Mott | 73/862.49 X |
| 4,928,538 | 5/1990 | Burdess et al. | 73/862.41 |
| 5,359,904 | 11/1994 | Luukkala . | |

FOREIGN PATENT DOCUMENTS

| | | |
|---|---|---|
| 0477942 | 4/1992 | European Pat. Off. . |
| 381633 | 4/1991 | Japan . |
| 6137932 | 5/1994 | Japan . |
| 0781627 | 11/1980 | U.S.S.R. ............... 73/862.41 |
| 2109556 | 6/1983 | United Kingdom . |

OTHER PUBLICATIONS

International Publication No. WO87/05699, dated Sep. 24, 1987.

Primary Examiner—George M. Dombroske
Attorney, Agent, or Firm—Sughrue, Mion, Zinn, Macpeak & Seas, PLLC

[57] ABSTRACT

An apparatus for measuring a tension (T) of a belt in a spanned state includes a vibration detector (1A) for detecting a vibration of the belt, a vibration frequency arithmetic unit (2A) for arithmetically determining a vibration frequency on the basis of the vibration as detected, and a tester (3) equipped with a display device (35). The tester (3) includes an information processor (32) for arithmetically determining a tension (T) of the belt on the basis of the vibration frequency supplied from the vibration frequency arithmetic unit (2A) and information about the belt read out from a storage medium (9), and the display device (35) for displaying the result of the arithmetic operation performed by the information processing means. The storage medium (9) is constituted by an external memory unit capable of being detachably connected to the tester (3). The tension measuring apparatus can profitably be used for detection of a tension (T) of a belt of a belt transmission mechanism employed in a motor vehicle with high accuracy and flexibility.

13 Claims, 4 Drawing Sheets

APPARATUS FOR MEASURING TENSION OF BELT

BACKGROUND OF THE INVENTION

1. Field of the Invention

The present invention relates to a belt tension measuring apparatus for measuring a tension of a belt spanned under tension. More particularly, the invention is concerned with a belt tension measuring apparatus for measuring tension of a belt employed in a power transmission mechanism such as a belt spanned under tension between pulleys of a belt/pulley transmission mechanism of an internal combustion engine for a motor vehicle, although the invention can find other applications.

2. Description of Related Art

Figure 4:
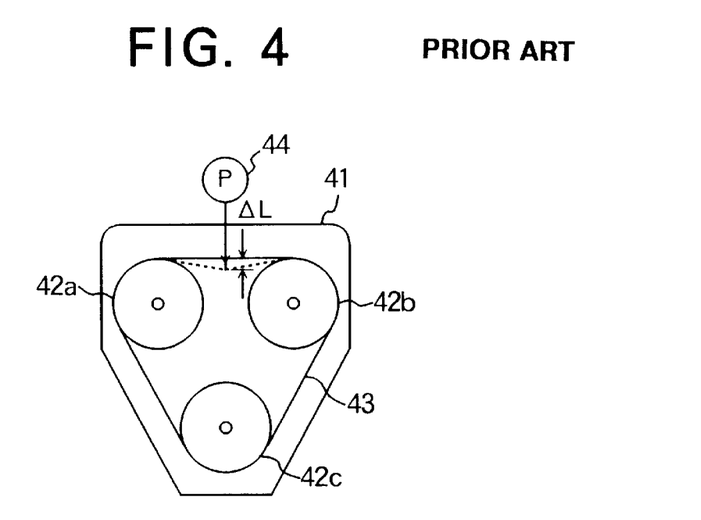
FIG. 4 is a schematic diagram for illustrating a conventional method known heretofore for measuring a tension of a belt of a power transmission mechanism of an internal combustion engine for a motor vehicle.

For having better understanding of the present invention, description will first be made in some detail of the background techniques thereof. FIG. 4 is a schematic diagram for illustrating a conventional method known heretofore for measuring a tension of a belt constituting a part of a power transmission mechanism of an internal combustion engine for a motor vehicle. Referring to the figure, a belt 43 is spanned over and around pulleys 42a, 42b and 42c. For measuring a tension of the belt 43, the belt 43 is pushed downwardly under a predetermined pressure applied by means of a pressure gauge (or manometer) 44 disposed so as to bear against the belt 43 at a predetermined position thereof, whereby the belt 43 is deflected downwardly by a predetermined distance or deflection $\Delta L$. The pressure $P_1$ applied to the belt 43 at that time point is measured by using the pressure gauge 44 itself.

Now, the belt tension measuring method will be elucidated. It is practically impossible to measure straightforwardly or directly the tension of the belt in the state spanned between and around the pulleys 42a and 42b. Accordingly, in order to measure the tension of the belt 43 spanning the pulleys 42a and 42b, the pressure gauge 44 is pressed against the belt 43 approximately at a mid or center position thereof under a preset pressure to thereby deflect the belt 43 by a predetermined magnitude. In this state, deflection $\Delta L$ of the belt 43 as well as a pressure $P_1$ read from the pressure gauge are recorded.

Subsequently, the tension T of the belt 43 is estimated in accordance with an expression defining a relation between the pressure $P_1$ and the deflection $\Delta L$, which relation has previously been determined experimentally by a bench test or the like process.

Figure 5:
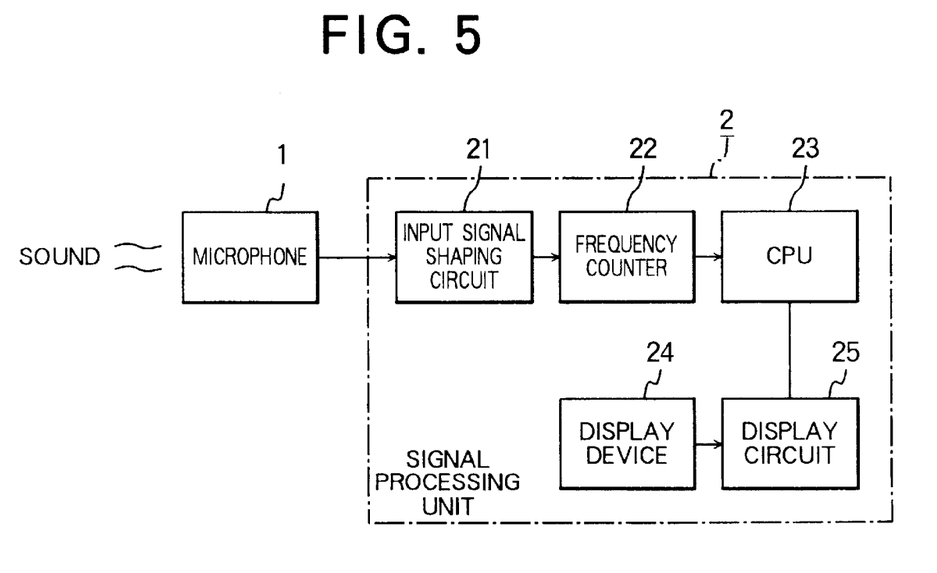
FIG. 5 is a block diagram showing schematically an apparatus for measuring a string tension of a musical instrument.

Further, as an applied technique of the tension measurement for a flexible member such as the belt employed in association with a power transmission such as that of the engine of a motor vehicle, there is known, for example, a string tension measuring technique adopted in a process for tuning a string instrument. FIG. 5 is a block diagram showing schematically an apparatus for measuring a string tension of a musical instrument. A sound generated by vibration of a string of concern is collected by a microphone 1 which converts the sound as caught into an electric acoustic signal which is then outputted to a signal processing unit 2 which serves for processing the acoustic signal supplied from the microphone 1 to thereby measure a natural oscillation or vibration frequency of the string and display the natural (vibration) frequency (also known as the characteristic or proper frequency) in the form of numerical values.

To this end, the signal processing unit 2 is comprised of an input signal shaping circuit 21 for shaping waveform of the acoustic signal inputted from the microphone 1 to thereby eliminate noise components, a frequency counter 22 for sampling or quantizing the acoustic signal outputted from the input signal shaping circuit 21 to thereby convert the input signal into a digital signal for the purpose of frequency measurement thereof, a CPU (abbreviation of Central Processing Unit) 23 for processing the frequency data as measured for the numerical display thereof, and a display drive circuit 25 for displaying the frequency data as processed on a display device 24.

Operation of the string tension measuring apparatus will be explained briefly. When a string of a musical instrument such as violin is caused to vibrate under frictional sweeping of a bow, the string vibrates at a frequency intrinsic to the string, whereby a vibration sound is generated, which sound is collected by the microphone 1 to be converted into an electrical acoustic signal. In the signal processing unit 2, the acoustic signal undergoes the waveform shaping processing effected by the input signal shaping circuit 21 for the purpose of noise elimination. The acoustic signal outputted from the signal input shaping circuit 21 is then inputted to the frequency counter 22 to be converted into a corresponding digital signal, from which frequency data is generated by counting the pulses contained in the digital signal.

The frequency data is then processed by the CPU 23 to a form suited for a numerical display to be subsequently displayed on the display device 24. In this conjunction, it will readily be appreciated that the technique for measuring the natural vibration frequency of the of the string of a musical instrument can be applied to measurement of the natural vibration of a belt employed in the engine for the motor vehicle by collecting the vibration sound generated by the belt by applying a vibration and collecting it by the microphone 1 and processing the acoustic signal by the signal processing unit 2 for displaying the natural vibration frequency of the belt and/or the tension arithmetically determined on the natural vibration frequency in terms of a numerical value.

However, because the hitherto known belt tension measuring method for estimating the tension of the basis of a relation between the deflection of the belt as brought about by applying a pressure by means of the pressure gauge is essentially of mechanical nature, it is necessarily required that there has to be available a relatively large space for accommodating or installing the pressure gauge as well as an instrument for measuring the deflection. In other words, the hitherto known method is imposed with spatial limitation and thus encounters great difficulty in carrying out the tension measurement in the environment where the available space is restricted. Additionally, the mechanical tension measuring method known heretofore suffers a problem that the tension as measured is susceptible to error involved due to error in reading the values as measured.

Furthermore, in conjunction with the procedure for determining the tension of the belt employed in the motor vehicle by vibrating it for reading the natural vibration frequency thereof, it is noted that the natural vibration frequency of belts may vary from one to another belt in dependence on the sizes of the belts as well as the span length thereof even when the belts are made of a same material. Consequently, there has been required a frequency-to-tension conversion look-up or reference table containing proportional constants for conversion of the natural vibration frequency to the tension by taking into account the sizes of the belts, the states in which the belts are spanned between or among the pulleys and other conditions. To say in another way, the belt spanning condition may differ from one to another motor vehicle. Thus, because the frequency-to-tension conversion table has to be renewed or updated every time the belt spanning condition or state varies or changes, there arises an additional problem that the belt tension measurement can not be effected with reliability immediately after the exchange of the belt with a fresh one.

SUMMARY OF THE INVENTION

In the light of the state of the art described above, it is an object of the present invention to provide a belt tension measuring apparatus which is essentially immune to the drawbacks of the hitherto known belt tension measuring techniques mentioned above.

Another object of the present invention is to provide a belt tension measuring apparatus of a motor vehicle which apparatus renders it possible to measure tensions for a plurality of belts employed in different internal combustion engines or motor vehicles, respectively, in terms of a desired physical unit common to the different internal combustion engines or motor vehicles.

Yet another object of the present invention is to provide a belt tension measuring apparatus which can be operated even in the environmental conditions where a space available for measurement is restricted.

A further object of the invention is to provide a belt tension measuring apparatus whose function can be realized at least partially by means of an apparatus which is designed to be used in common for diagnosing a plurality of different types internal combustion engines of motor vehicles as to occurrence of abnormality.

In view of the above and other objects which will become apparent as the description proceeds, there is provided according to a general aspect of the present invention an apparatus for measuring a tension of a belt in a spanned state, which apparatus includes a vibration detecting means for detecting a vibration of a belt which is excited by applying vibration exciting energy thereto, a vibration frequency arithmetic means for arithmetically determining a vibration frequency on the basis of a vibration signal outputted from the vibration detecting means, and an information processing/display means. The information processing/display means includes an information processing means for arithmetically determining a tension of the belt on the basis of the frequency vibration information supplied from the vibration frequency arithmetic means and information concerning the belt under measurement read out from storage means, and a display means for displaying the result of the arithmetic operation performed by the information processing means. The storage means is constituted by an external memory unit capable of being detachably connected to the information processing/display means.

Because of use of the external memory unit which can removably be mounted on the processing display means as mentioned above, one and the same apparatus can be used in common for measuring tensions of belts which may differ from one to another simply by exchanging the external memory unit as occasion requires.

In the belt tension measuring apparatus described above, the external memory unit may preferably be so arranged as to store therein information including information for identifying a plurality of belts which are to be subjected to tension measurement, respectively, and parameters which are involved in determination of the tension, in correspondence to the identification information, respectively.

By virtue of use of the external memory unit containing the information of plural belts which may differ from one another, one and the same tension measuring apparatus can be used in common for tension measurement for a number of belts identified by the identification information without need for exchanging the external memory unit.

In a preferred mode for carrying out the invention, either one of the vibration frequency arithmetic means or the information processing/display means may be so designed as to determine a natural vibration frequency of the belt under measurement. In that case, the information processing means can arithmetically determine the tension of the belt under measurement in accordance with:

$$T = k \cdot m \cdot l^2 \cdot f^2$$

where k represents a constant, l represents a span length of the belt, m represents a unit weight or mass of the belt, and f represents a resonance vibration frequency of the belt.

With the arrangement described above, the tension of the belt can be determined with high accuracy and reliability because of arithmetic tension determination based on the resonance vibration frequency of the belt.

In another preferred mode for carrying out the invention, the vibration detecting means, the vibration frequency arithmetic means and the information processing/display means may be implemented as discrete units separated from one another and electrically connectable to one another by connector means.

By implementing the vibration detecting means, the vibration frequency arithmetic means and the information processing as physically separate units, the tension measuring apparatus can be employed even in an environment in which the space available for measurement is much limited, because it is sufficient to allow only the vibration detecting means such as a microphone or the like sensor probe to access the belt.

Furthermore, the vibration detecting means, vibration frequency arithmetic means and the information processing/display means may be implemented as discrete units which are separated from one another and adapted to be electrically coupled to one another by way of wireless communication paths.

Owing to the arrangement described above, the manipulatability of the tension measuring apparatus can significantly be enhanced.

In yet another mode for implementing the invention, the belt tension measuring apparatus according to the invention, the information processing means may be so designed to diagnose operation of an apparatus equipped with a power transmission mechanism a part of which is constituted by the belt. In that case, the storage means may be adapted to store therein additional information to be referenced upon execution of the diagnosis.

By virtue of the arrangement described above, the tension measuring apparatus according to the invention can be used for diagnosing an apparatus including a belt transmission mechanism such as a motor vehicle as to occurrence of abnormality or fault in the apparatus of concern in addition to the measurement of the belt tension.

In yet another preferred mode for carrying out the invention, the apparatus is imparted with a function for diagnosing a motor vehicle in which a belt constituting a part of a power transmission mechanism is used. In that case, the information processing/display means may include a diagnosing means for diagnosing a plurality of different type motor vehicles in common as to occurrence of abnormality on the basis of information supplied from the storage medium, an interface means for communication with an electric control unit of the motor vehicle, and a display device for displaying the result of the diagnosis, while the storage means may be constituted by an external memory unit for storing the belt information together with information required for the diagnosis of the motor vehicles. External storage medium may be so implemented as to be removably attached to the motor vehicle diagnosing means.

With the arrangement of described above, one and the same apparatus can be used for measuring tensions of belts employed in a plurality of motor vehicles which may be of types differing one another as well as for diagnosis thereof.

In conjunction with the arrangement described above, the storage means may be provided for a plurality of different types of motor vehicles, being dedicated thereto, respectively, and exchangeable with one another in dependence on the types of the motor vehicles.

In this case, the belt tension measurement and diagnosis for a plurality of motor vehicle can be performed by one and other same apparatus simply by exchanging the removable external memory unit.

In yet further preferred mode for carrying out the invention, the information processing means additionally may serve for making decision as to whether vibration of the belt tension determined arithmetically lies within a permissible tolerance by reference to the belt information stored in said external memory unit.

Owing to the arrangement described above, quality control of the belt can easily be realized on the basis of the information as display.

The information processing/display means may be so programmed as to process analytically the vibration frequency inputted and display the result of the analytical processing on the display device.

With the arrangement described above, the quality control of the belt can be performed with high accuracy, because the condition or state of the belt, degree of fatigue thereof and the like can be determined on the basis of the result of the frequency analysis as displayed on the display means.

Advantageously, the information processing/display means may be programmed as to update content of the display upon every inputting of vibration detection signals from the frequency arithmetic means.

With the above arrangement of the apparatus, the results of the vibration analyses can discretely be displayed in succession in response to the vibration detection signals inputted successively. Thus, the apparatus can enjoy high manipulatability.

In a mode for carrying out the invention, the vibration frequency arithmetic means may be so implemented as to send out the vibration determined arithmetically to said processing/display means through a full-duplex serial communication.

Owing to the full-duplex communication, serial data communication can be performed even when a fault occurs in one communication line. Thus, the apparatus can enjoy enhanced reliability.

In yet another preferred mode for carrying out the invention, various data transferred between the information processing/display means and the vibration frequency arithmetic means may be transmitted through a multiplex communication via a same transmission path by modulating the various data through a frequency modulation, pulse-width modulation and a voltage level modulation, respectively.

Owing to the communications mentioned above, transmission time as well as processing time for a plurality of data can be shortened.

Furthermore, according to another aspect of the invention, there is provided an apparatus for measuring at least one of tension and vibration characteristics of an object of concern, which apparatus includes a vibration detecting means, a vibration frequency arithmetic means and an information processing/display means implemented in the form of independent units which can be detachably be coupled together to one another. The vibration detecting means may be constituted by either an acoustic vibration sensor or a direct-contact type vibration sensor, while the vibration frequency arithmetic means may be composed of an input signal comparator for comparing a level of the vibration detection signal supplied from the vibration detecting means with a preset signal input level to thereby receive the vibration detection signal when the level thereof exceeds the preset input level, a signal conditioning means for shaping a waveform of the vibration detection signal and for eliminating noise components from the vibration detection signal, a first central processing unit for converting the vibration detection signal into a corresponding digital signal to thereby arithmetically determine the vibration frequency, and a first interface for converting data of the vibration frequency outputted from the first central processing unit into a signal for transmission to the information processing/displaying means. In that case, the information processing/display means may be constituted by a second interface for receiving the signal, a second central processing unit for processing the signal to thereby arithmetically determine at least one of a tension and vibration characteristic of the object of concern on the basis of the vibration frequency represented by the aforementioned signal in accordance with predetermined corresponding programs, a display device for displaying result of the arithmetic determination, a reset circuit for outputting to the second central processing unit a reset signal indicating resetting of an image being displayed on the display device, and a display reset circuit responding to the vibration detection signal inputted from the input signal comparator at a same time point when the reset signal from the reset circuit is generated, to thereby reset a display being generated currently in order to display the tension and/or vibration characteristics determined arithmetically on the basis of the vibration frequency corresponding to said detection signal supplied from the input signal comparator.

By virtue of the arrangement described above, there can be realized a multi-function tester apparatus which is capable of measuring not only the tension but also the vibration characteristics.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of description which follows, reference is made to drawings, in which.

DESCRIPTION OF PREFERRED EMBODIMENTS

Now, present invention will be described in detail in conjunction with what is presently considered as preferred or typical embodiments thereof by reference to drawings. In following description, like reference characters designate like or corresponding parts throughout several views.

Embodiment 1

Figure 1:
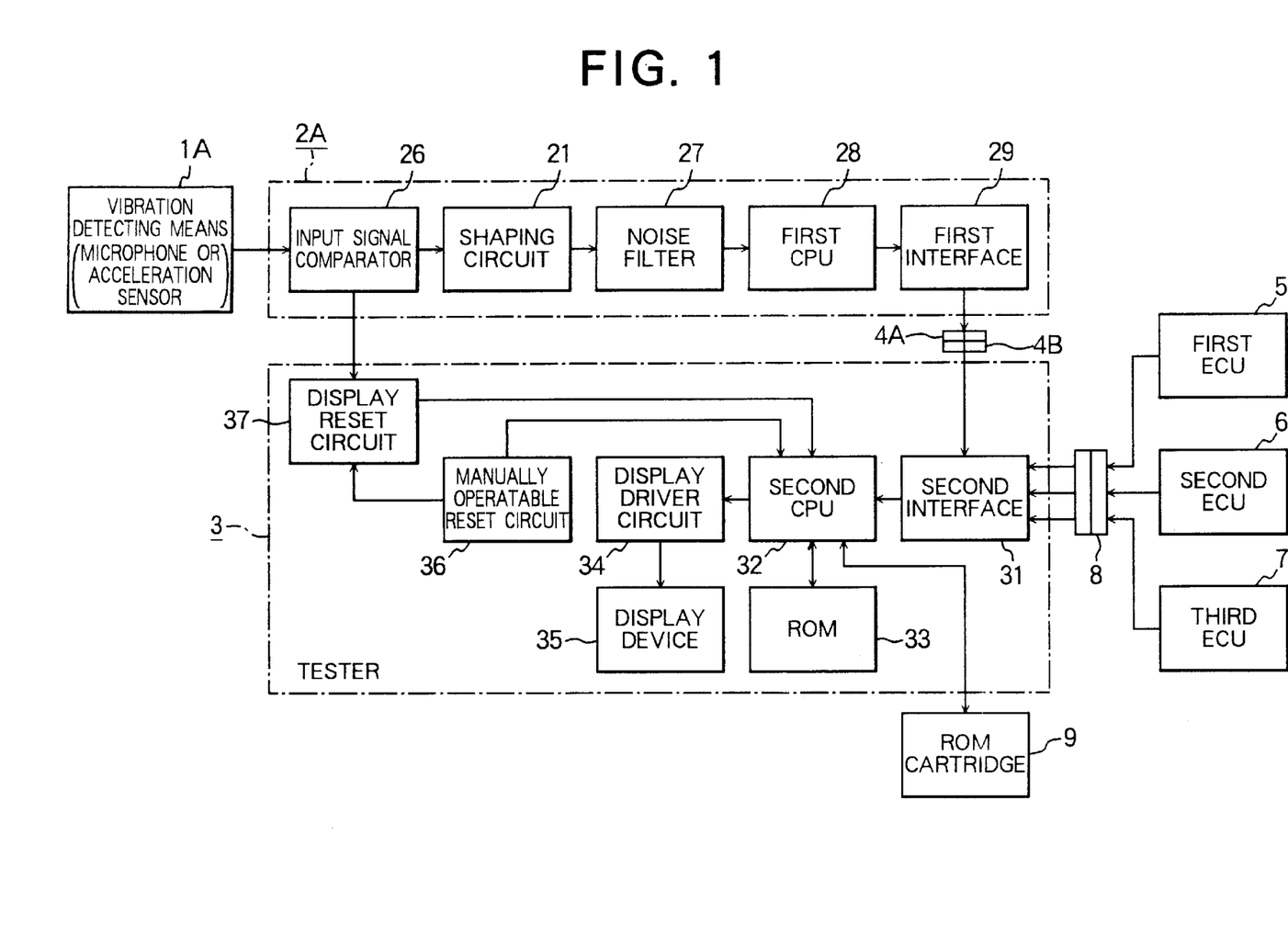
FIG. 1 is a block diagram showing generally a structure of a belt tension measuring apparatus according to a first embodiment of the present invention.
Figure 3:
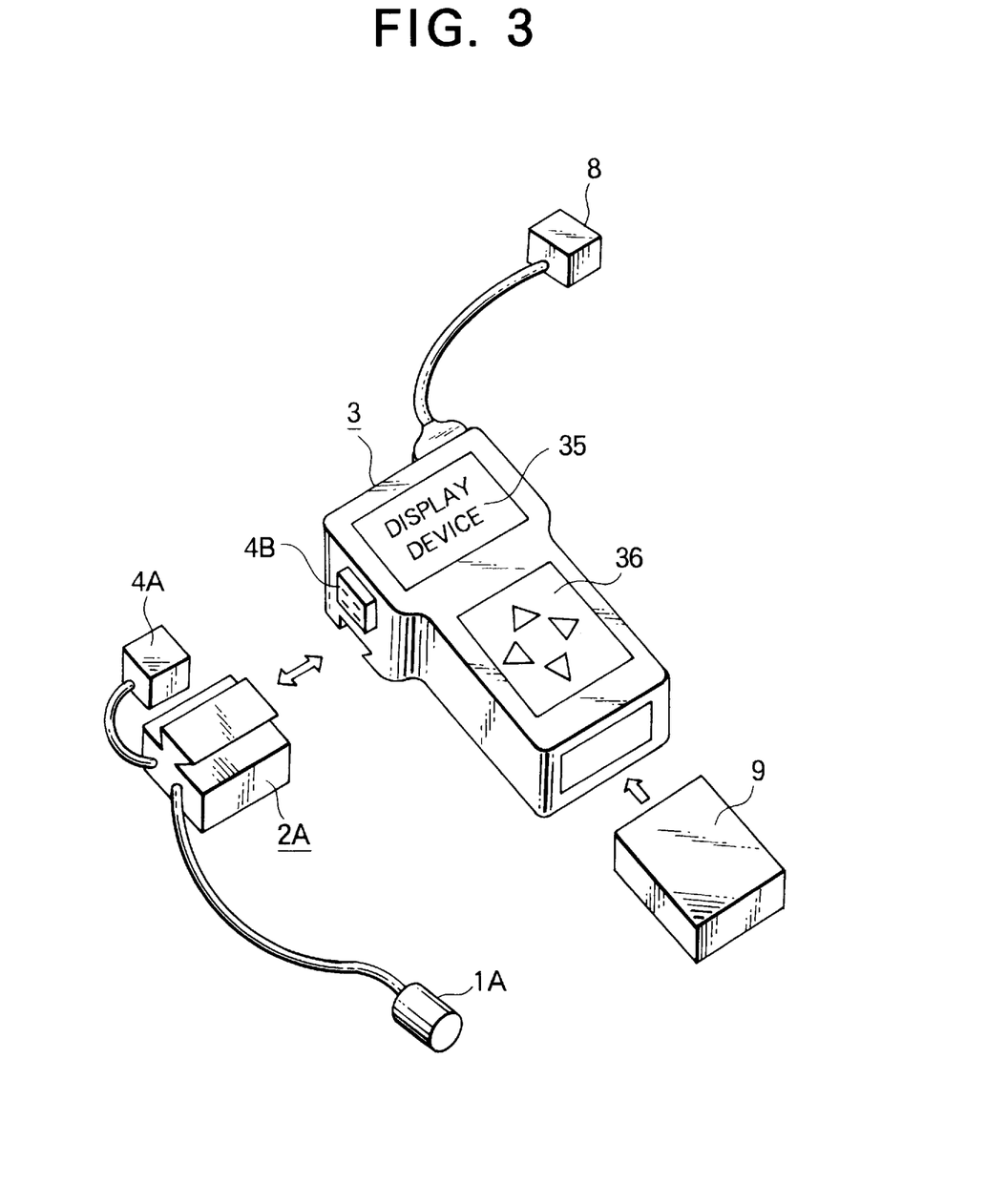
FIG. 3 is a pictorial view showing an outer aperture of the belt tension measuring apparatus as a whole.

FIG. 1 is a block diagram showing generally a structure of the belt tension measuring system or apparatus according to a first embodiment of the invention, and FIG. 3 is a pictorial view showing an outer aperture of the belt tension measuring apparatus as a whole. Referring to the figures, the belt tension measuring apparatus according to the instant embodiment of the invention is comprised of a vibration detecting means 1A for detecting a vibration sound or vibration of a belt employed, for example, in a motor vehicle for power transmission, to thereby convert the vibration into an electric signal to be outputted as a vibration detection signal, an adapter 2A serving as a vibration frequency arithmetic means for measuring the frequency of the vibration detection signal to thereby convert it to a digital frequency signal, and a tester 3 provided in common to a plurality of different type motor vehicles and serving both for motor vehicle diagnosing function for diagnosing the motor vehicle by resorting to computer techniques as to the occurrence of abnormality by processing fault diagnosis information inputted from an electronic control unit (hereinafter referred to as the ECU in abbreviation) 5, 6 or 7 mounted on the motor vehicle of concern and for a tension determining function for arithmetically determining and displaying a tension of a belt employed in the motor vehicle on the basis of the vibration frequency signal as inputted from the adapter 2A and belt data or the like information stored in a read-only memory cartridge (hereinafter referred to simply as the ROM cartridge) 9 and the vibration frequency signal inputted from the adapter 2A.

The adapter 2A and the tester 3 are mutually connected by connectors 4A and 4B for allowing the vibration frequency signal to be supplied to the tester 3. On other hand, the ECU 5, 6 or 7 and the tester 3 are adapted to be connected to each other by a connector 8 for allowing the data or information for the fault diagnosis to be transferred between the tester 3. Further, the ROM (Read-Only Memory) cartridge 9 mentioned above is removably mounted on a casing of the tester 3 to allow a central processing unit or CPU 32 to fetch from the ROM cartridge 9 the data for arithmetic determination of a tension of the belt of concern or data used for the diagnosis purpose. More specifically, there are stored in the ROM cartridge 9 in the form of a database the data which include, for example, the motor vehicle model or belt identification information, belt span, mass of the belt per unit length, type or structure of the belt and the like, and which data can be referenced and utilized for determining the belt tension on the basis of the belt vibration frequency supplied from the adapter 2A.

Referring to FIG. 1, the adapter 2A is composed of an input signal comparator 26 for comparing the level of the vibration detection signal supplied from the vibration detecting means 1A such as a microphone or acceleration sensor with a preset signal input level to thereby receive the vibration detection signal when the level thereof exceeds the preset input level, a shaping circuit 21 for shaping a waveform of the vibration detection signal as received, a noise filter 27 for eliminating noise components from the vibration detection signal outputted from the shaping circuit 21, a first CPU 28 for converting the vibration detection signal undergone the noise filtering into a corresponding digital signal to thereby arithmetically determine the vibration frequency, and a first interface 29 for converting the vibration frequency data outputted from the first CPU 28 into a serial signal for transmission of the frequency data to thereby output the serial signal through the connectors 4A, 4B for the adapter 2A.

On the other hand, the tester 3 is comprised of a second interface 31 for converting the serial communication signal inputted through the connectors 4A and 4B and the serial signal supplied from the ECU 5, 6 or 7 via the connector 8 into the parallel data, respectively, a CPU 32 for processing the parallel signals inputted via the second interface 31 in accordance with a diagnosis test program stored in a ROM (Read-Only Memory) 33, a display driver circuit 34 for displaying the result of processing executed by the second CPU 32 on a display device 35, a manually operatable reset circuit 36 for outputting to the second CPU 32 a reset signal indicating the resetting of an image displayed on the second CPU 32 or an automatic reset signal for resetting automatically the image or data being generated on the display device 35 in synchronism with or in response to the inputting of the vibration detection signal, and a display reset circuit 37 which responds to inputting of the vibration detection signal supplied from the input signal comparator 26 incorporated in the adapter 2A at a same time point when the automatic reset signal from the manually operatable reset circuit 36 is generated, to thereby reset the current display, in order to display the tension determined arithmetically on the basis of the vibration detection signal supplied from the input signal comparator 26.

Operation of the belt tension measuring apparatus according to the instant embodiment of the invention implemented in the structure described above will be elucidated by reference to FIGS. 1 and 2, wherein FIG. 2 is a flow chart for illustrating operation of the adapter 2A and the tester 3.

As is known in the art, relation between a tension T of a belt and a vibration frequency f thereof can generally be expressed as follows:

$$T = k \cdot m \cdot l^2 \cdot f^2 \tag{1}$$

where m represents mass of the string per unit length, l represents a distance or length of the string between supporting points therefor, and k represents a constant.

Thus, in accordance with the above expression (1), it is possible to arithmetically determine the tension T of a belt employed in a motor vehicle for power transmission, so far as the mass m per unit length and the span l thereof are known.

Thus, for measuring the tension T, the belt of concern employed in the motor vehicle is caused to vibrate by applying a force or shock to the belt in accordance with a predetermined appropriate method and vibration of the belt is detected by using the vibration detecting means 1A which may be constituted, by way of example, by a microphone or an belt-affixed acceleration sensor of a weight which is so small as to be negligible when compared with the mass or weight of the belt. The vibration detection signal as detected is supplied to the adapter 2A to be converted to the vibration frequency signal through the arithmetic operation performed by the first CPU 28.

Figure 2:
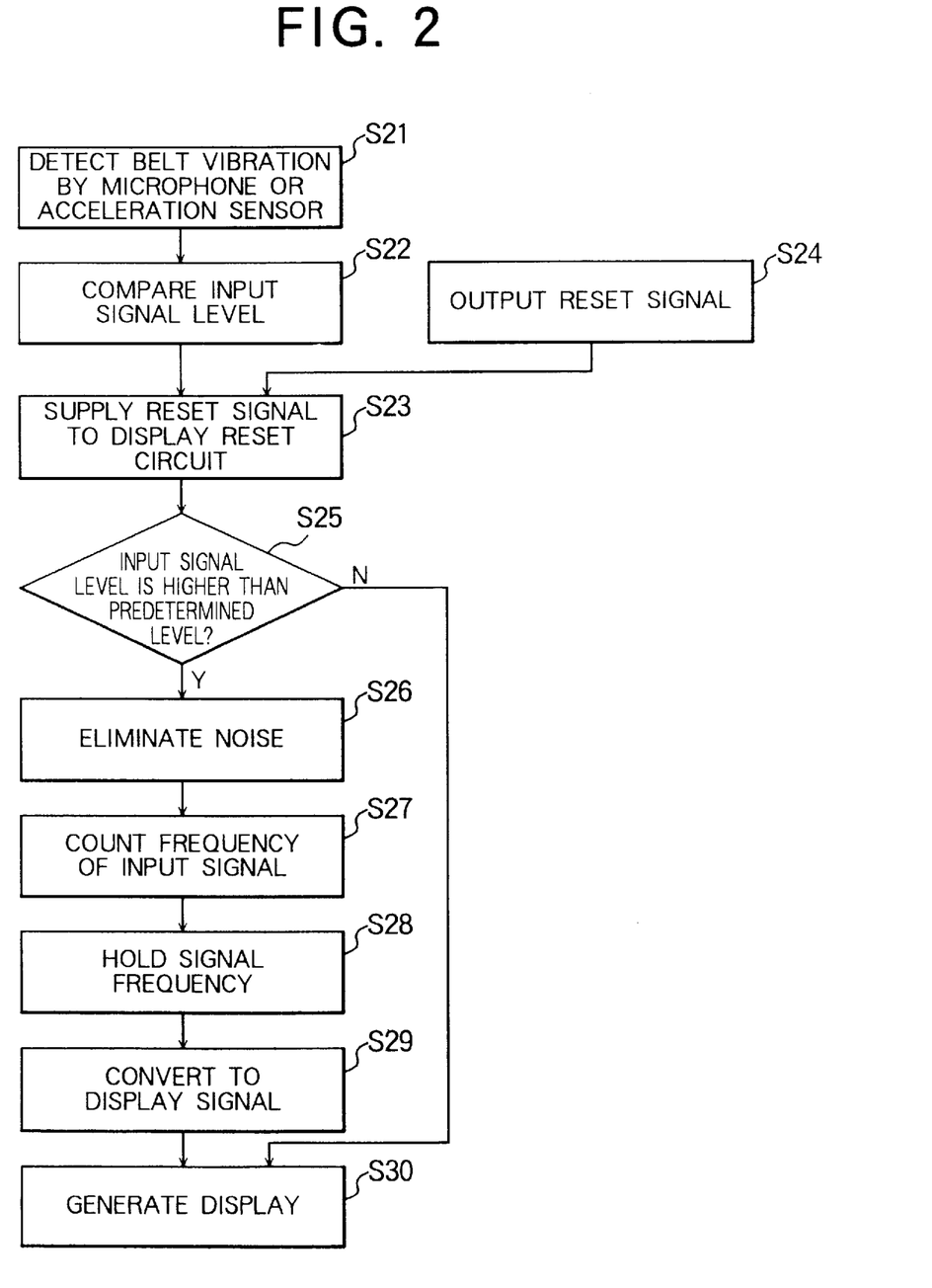
FIG. 2 is a flow chart for illustrating operations of an adapter and a tester of the apparatus.

The arithmetic determination of the vibration frequency will now be elucidated by reference to a flow chart of FIG. 2. At first, vibration of the belt of concern is detected by the vibration detecting means 1A in a step S21. Subsequently, the detected vibration signal is inputted to the input signal comparator 26 in a step S22. When the automatic reset signal is inputted from the manually operable reset circuit 36 at this time point, the display reset circuit 37 outputs a reset signal to the second CPU 32 to clear the image or picture being displayed currently for establishing the state ready for displaying the belt tension determined by the second CPU 32 on the basis of the vibration detection signal inputted currently (steps S23 and S24).

In a step S25, the level of the vibration detection signal as inputted is compared with the preset signal input level, whereon the vibration detection signal is inputted to the noise filter 27 for elimination of noise component therefrom after having been processed by the shaping circuit 21 in a step S26. The vibration detection signal resulting from the noise elimination processing is sampled by the first CPU 28 to be converted to a digital signal. By counting pulses of the digital signal obtained from the digital conversion, the frequency data of the vibration detection signal is acquired in a step S27. This frequency data is held by the first CPU 28 and at same time outputted to the second interface 31 of the tester 3 via the connectors 4A and 4B after having been converted into a serial frequency signal by the first interface 29. In the second interface 31, the serial frequency data is converted to parallel data which is then inputted to the second CPU 32 in a step S28.

The second CPU 32 arithmetically determines or calculates the tension of the belt of concern on the basis of the frequency data as inputted and the data concerning the belt or motor vehicle identification information, the belt span length, the mass of the belt per unit length thereof, the type or structure thereof and the like data as read out from the ROM cartridge 9. Subsequently, in a step S29, the second CPU 32 outputs the result of the arithmetic determination or calculation to the display driver circuit 34 for displaying the result of calculation in terms of the tension together with information obtained from a decision process executed for deciding whether or not the tension as determined arithmetically falls within a redetermined range of tolerance, which range in turn may be determined on the basis of the data stored in the RAM cartridge 9. As a result of this, the display driver circuit 34 displays on the display device 35 the tension of the belt as well as the information concerning the result of the above-mentioned decision (step S30).

On the other hand, upon detection of intolerable error in the data as obtained, the operator activates the reset circuit 36 to enable it to output the reset signal to the second CPU 32 for clearing the result of the arithmetic determination based on the measured data as well as the tension being displayed currently. Furthermore, when the vibration frequency values based on the results of repetitive measurements of the vibration of the belt are to be displayed on the display device 35 while updating automatically the content of the display upon every measurement, the reset circuit 36 is so manipulated as to allow the automatic reset signal to be inputted to the display reset circuit 37. In that case, the display reset circuit 37 outputs the reset signal to the second CPU 32 in response to the input of the vibration detection signal of a predetermined level from the input signal comparator 26.

As a result, the second CPU 32 saves the data of the vibration frequency and the belt tension being currently displayed to thereby clear the corresponding display generated on the display device 35 to make preparation for displaying the vibration frequency value and the tension value based on the vibration detection signal fetched in succession. In this conjunction, it can readily be understood that when the belt tension measurement for a motor vehicle of different type is of concern, the relevant reference data can be updated by simply exchanging the ROM cartridge 9 with one which stores the data for the aforementioned motor vehicle. Alternatively, the ROM cartridge 9 may store the reference data for a plurality of different types belts or motor vehicles, respectively, so that the data updating can be accomplished without need for exchanging the ROM cartridge 9.

Embodiment 2

In the case of the belt tension measuring apparatus according to the first embodiment of the invention described above, it is assumed that a half-duplex communication is adopted between the adapter 2A and the tester 3 in which the vibration frequency information or data is transferred serially between the adapter 2A and the tester 3 through a single line. However, by adopting a duplex data communication based on a full-duplex communication scheme, it is possible to transfer serially the vibration frequency information by way of one line with the other line being used as a backup line for communication when contact failure is detected in the connectors 4A, 4B. Of course, it is possible to realize the communication on the basis of half-duplex scheme when restriction is imposed to the number of wiring conductors.

Embodiment 3

In the belt tension measuring apparatus according to the third embodiment of the invention, it is proposed that in the serial communication system for the vibration frequency signal described above, it is possible to transfer simultaneously plural types of data through a single transmission line for thereby realizing a multiplex communication by adopting frequency modulation and/or pulse width modulation (PWM) for transmission of a plurality of data to be transferred.

Embodiment 4

In the case of the belt measuring apparatus according to the first embodiment of the invention, the apparatus is assumed to be so arranged as to measure the natural vibration (also known as the characteristic or proper vibration frequency) of the belt which occurs upon application of impulsive shock to the belt. In this conjunction, it should however be mentioned that by imparting a vibration analysis function to the tester by providing a specific database intrinsic to the motor vehicle of concern in the tester, it is possible to determine the belt tension by analyzing not only the noise or sounds generated continuously by the belt but also the vibration or energy spectra thereof generated contiguously by the belt. In that case, it is possible to display vibration characteristics as well as degree of fatigue of the belt on the basis of the result of the analysis in the form of a corresponding message on the display device 35.

Embodiment 5

Instead of displaying the belt tension in the manner described above, it is possible to display on the display device of the tester a graph indicative of the analogue values on a time-serial basis by fetching the frequency values in succession. In that case, the degree of fatigue which the belt suffers as well as the timing for exchanging the belt with a fresh one in the future can be estimated. In addition, frequency values generated in succession can be stored in a RAM (Random Access Memory) to be displayed on an external oscilloscope.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described By way of example, it should be mentioned that the concept underlying the invention is never limited to application or the measurement of vibration frequency and hence tension of a belt employed in a motor vehicle but may find application to vibration analysis of driving state of the internal combustion engine itself and/or vibration of a chassis of the motor vehicle on the condition that the corresponding database is stored in the ROM cartridge (9). Moreover, although the invention has been described that the vibration detecting means 1A, the adapter 2A and the tester 3 are interconnected by wiring, it should be appreciated that such interconnection can be implemented wireless. Further, the invention is not limited to measurement of tension and vibration characteristics of a belt, but can equally find general application to other objects of which tension and vibration are of concern. Besides, although it has been described that the discrete units are connected by wires, it goes without saying that signal transfers among these units may be realized through wireless communication. In that case, manipulatability of these units can be improved.

Accordingly, all suitable modifications and equivalents may be resorted to, falling within the spirit and scope of the invention.

What is claimed is:

1. An apparatus for measuring a tension of a belt in a scanned state, comprising:

vibration detecting means for detecting a vibration of said belt, said vibration being excited by applying vibration exciting energy to said belt;

vibration frequency arithmetic means for arithmetically determining a vibration freauency based on a vibration signal output from said vibration detecting means;

storage means for storing belt information about said belt;

information processing means for performing an arithmetic operation to determine said tension of said belt based on said vibration frequency supplied from said vibration frequency arithmetic means and said belt information read from said storage means; and display means for displaying a result of said arithmetic operation performed by said information processing means, wherein said storage means comprises an external memory unit capable of being detachably connected to said information processing means, wherein said external memory unit stores identification information for identifying a plurality of belts and stores parameters which are used to determine said tension, and wherein said parameters correspond to said identification information, wherein one of said vibration frequency arithmetic means and said information processing means is designed to determine a resonance vibration frequency of said belt, and wherein said information processing means performs said arithmetic operation to determine said tension of said belt in accordance with the following equation:

$$T = k \cdot m \cdot l^2 \cdot f^2$$

where k represents a constant, l represents a span length of said belt, m represents a unit weight or mass of said belt, and f represents a resonance vibration frequency of said belt.

2. An apparatus for measuring a tension of a belt in a spanned state, comprising:

vibration detecting means for detecting a vibration of said belt, said vibration being excited by applying vibration exciting energy to said belt;

vibration frequency arithmetic means for arithmetically determining a vibration frequency based on a vibration signal output from said vibration detecting means;

storage means for storing belt information about said belt;

information processing means for performing an arithmetic operation to determine said tension of said belt based on said vibration frequency supplied from said vibration frequency arithmetic means and said belt information read from said storage means; and display means for displaying a result of said arithmetic operation performed by said information processing means, wherein said storage means comprises an external memory unit capable of being detachably connected to said information processing means, wherein said external memory unit comprises a semiconductor memory device, and wherein said information processing means determines whether or not said vibration of said belt lies within a permissible tolerance based on said belt information stored in said external memory unit.

3. An apparatus for measuring a tension of a belt in a spanned state, comprising:

vibration detecting means for detecting a vibration of said belt, said vibration being excited by applying vibration exciting energy to said belt;

vibration frequency arithmetic means for arithmetically determining a vibration frequency based on a vibration signal output from said vibration detecting means;

storage means for storing belt information about said belt;

information processing means for performing an arithmetic operation to determine said tension of said belt based on said vibration frequency supplied from said vibration frequency arithmetic means and said belt information read from said storage means; and display means for displaying a result of said arithmetic operation performed by said information processing means, wherein said belt constitutes at least a part of a power transmission mechanism, wherein said information processing means is designed to perform a diagnosis of an operation of an apparatus equipped with said power transmission mechanism, wherein said storage means stores additional diagnosis information to be referenced when said diagnosis is performed, wherein said apparatus equipped with said power transmission mechanism is a motor vehicle;

wherein said information processing means comprises:

diagnosing means for performing diagnoses of a plurality of different types of motor vehicles in common to detect an abnormality, wherein said diagnoses are performed based on diagnosis information supplied from said storage means; and interface means for communicating with an electronic control unit of said motor vehicle, and wherein said display means displays a result of said diagnoses.

4. A belt tension measuring apparatus according to claim 3, wherein said storage means and at least a second storage means are respectively provided for said plurality of different types of motor vehicles and wherein said storage means and said at least a second storage means are exchangeable with one another depending on said types of said motor vehicles.

5. An apparatus for measuring at least one of tension and vibration characteristics of an object of concern, comprising:

vibration detecting means for generating a vibration detection signal corresponding to at least one of said tension and vibration characteristics of said object;

vibration frequency arithmetic means for generating a vibration frequency signal based on said vibration detection signal; and information processing/display means for processing said vibration frequency signal, wherein said vibration detecting means, said vibration frequency arithmetic means, and said information processing/display means are independent units which can be detachably interconnected, wherein said vibration detecting means comprises one of an acoustic vibration sensor and a direct-contact type vibration sensor, wherein said vibration frequency arithmetic means comprises:

an input signal comparator for comparing a level of said vibration detection signal supplied from said vibration detecting means with a preset input level and for outputting said vibration detection signal when said level of said vibration detection signal exceeds said preset input level;

signal conditioning means for shaping a waveform of said vibration detection signal and for eliminating noise components from said vibration detection signal;

a first central processing unit for converting said vibration detection signal into a corresponding vibration frequency signal which relates to a vibration frequency of said vibration detection signal; and a first interface for inputting said vibration frequency signal and outputting a corresponding transmission signal, and wherein said information processing/display means comprises:

a second interface for receiving said transmission signal and outputting a data signal;

a second central processing unit for processing said data signal to thereby arithmetically determine at least one of said tension and vibration characteristics of said object based on said data signal;

a display device for displaying an image corresponding to at least one of said tension and vibration characteristics determined by said second central processing unit;

a reset circuit for outputting a first reset signal to said second central processing unit to reset said image being displayed on said display device when said reset circuit operates in a first mode and for outputting an automatic reset signal when said reset circuit operates in a second mode; and a display reset circuit which inputs said vibration detection signal from said input signal comparator when said automatic reset signal is generated by said reset circuit and which outputs a second reset signal reset said image in order to display at least one of said tension and vibration characteristics in accordance with said vibration detection signal supplied from said input signal comparator.

6. An apparatus for measuring a tension of a belt in a spanned state, comprising:

vibration detecting means for detecting a vibration of said belt, said vibration being excited by applying vibration exciting energy to said belt;

vibration frequency arithmetic means for arithmetically determining a vibration frequency based on a vibration detection signal output from said vibration detecting means;

storage means for storing belt information about said belt;

information processing means for performing an arithmetic operation to determine said tension of said belt based on said vibration frequency supplied from said vibration frequency arithmetic means and said belt information read from said storage means; and display means for displaying a result of said arithmetic operation performed by said information processing means on a display, wherein said storage means stores identification information for identifying a plurality of belts and stores parameters which are used to determine said tension, wherein said parameters correspond to said identification information, wherein one of said vibration frequency arithmetic means and said information processing means is designed to determine a resonance vibration frequency of said belt, and wherein said information processing means performs said arithmetic operation to determine said tension of said belt in accordance with the following equation:

$$T = k \cdot m \cdot l^2 \cdot f^2$$

where k represents a constant, l represents a span length of said belt, m represents a unit weight or mass of said belt, and f represents a resonance vibration frequency of said belt.

7. An apparatus for measuring a tension of a belt in a spanned state, comprising:

vibration detecting means for detecting a vibration of said belt, said vibration being excited by applying vibration exciting energy to said belt;

vibration frequency arithmetic means for arithmetically determining a vibration frequency based on a vibration signal output from said vibration detecting means;

storage means for storing belt information about said belt, information processing means for performing an arithmetic operation to determine said tension of said belt based on said vibration frequency supplied from said vibration frequency arithmetic means and said belt information read from said storage means; and display means for displaying a result of said arithmetic operation performed by said information processing means, wherein said storage means comprises an external memory unit capable of being detachably connected to said information processing means, wherein said belt constitutes a part of a power transmission mechanism for a motor vehicle, wherein said information processing means comprises:
  diagnosing means for performing diagnoses of a plurality of different types of motor vehicles in common to detect an abnormality, wherein said diagnoses are performed based on diagnosis information supplied from said storage means; and
  interface means for communicating with an electronic control unit of said motor vehicle,
wherein said display means displays a result of said diagnoses, and
wherein said storage means comprises an external memory unit for storing said belt information and said diagnosis information and wherein said external memory unit is removably attached to said diagnosing means.

8. A belt tension measuring apparatus according to claim 7, wherein said storage means and at least a second storage means are respectively provided for said plurality of different types of motor vehicles and wherein said storage means and said at least a second storage means are exchangeable with one another depending on said types of said motor vehicles.

9. A belt tension measuring apparatus according to claim 7,
  wherein said information processing means performs an analytical processing operation on said vibration frequency and said display means displays a result of said analytical processing operation on said display device.

10. A belt tension measuring apparatus according to claim 9,
  wherein said vibration frequency arithmetic means outputs said vibration detection signal to at least one of said information processing means and said display means, and
  wherein at least one of said information processing means and said display means is programmed to update a content of said display in response to said vibration detection signal input from said vibration frequency arithmetic means.

11. A belt tension measuring apparatus according to claim 7,
  wherein said vibration frequency arithmetic means transmits said vibration frequency to at least one of said information processing means and said display means via a full duplex serial communication.

12. A belt tension measuring apparatus according to claim 7,
  wherein various data transferred among at least two of said information processing means, said display means, and said vibration frequency arithmetic means are transmitted via multiplex communication using a same transmission path by modulating said various data via at least one of a frequency modulation, pulse-width modulation, and a voltage level modulation.

13. An apparatus for measuring a tension of a belt as claimed in claim 6, wherein said vibration frequency arithmetic means outputs said vibration detection signal to at least one of said information processing means and said display means, and
  wherein at least one of said information processing means and said display means is programmed to update a content of said display in response to said vibration detection signal input from said vibration frequency arithmetic means.

* * * * *